US012181993B1

(12) United States Patent
Zhao et al.

(10) Patent No.: US 12,181,993 B1
(45) Date of Patent: Dec. 31, 2024

(54) SYSTEMS AND METHODS FOR RESTORING BUS FUNCTIONALITY

(71) Applicant: Advanced Micro Devices, Inc., Santa Clara, CA (US)

(72) Inventors: KaiFei Zhao, Suzhou (CN); LiLi Chen, Suzhou (CN); Wei Han, Suzhou (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 62 days.

(21) Appl. No.: 18/078,735

(22) Filed: Dec. 9, 2022

(51) Int. Cl.
*G06F 11/00* (2006.01)
*G06F 11/07* (2006.01)
*G06F 11/14* (2006.01)
*G06F 11/30* (2006.01)

(52) U.S. Cl.
CPC ...... *G06F 11/3027* (2013.01); *G06F 11/0745* (2013.01); *G06F 11/0757* (2013.01); *G06F 11/0793* (2013.01); *G06F 11/1415* (2013.01)

(58) Field of Classification Search
CPC ............ G06F 11/1415; G06F 11/0745; G06F 11/0757; G06F 11/0793; G06F 11/141; G06F 11/3027
See application file for complete search history.

(56) References Cited

U.S. PATENT DOCUMENTS

| | | | | |
|---|---|---|---|---|
| 5,961,622 | A * | 10/1999 | Hudson | G06F 11/141 |
| | | | | 713/502 |
| 6,453,429 | B1 * | 9/2002 | Sadana | G06F 11/0772 |
| | | | | 714/E11.026 |
| 2015/0199822 | A1 * | 7/2015 | Tamasi | G06F 13/4282 |
| | | | | 345/520 |
| 2016/0357701 | A1 * | 12/2016 | Lee | G06F 1/24 |
| 2018/0314590 | A1 * | 11/2018 | Kothamasu | G06F 11/1048 |
| 2019/0227896 | A1 * | 7/2019 | Scherr | G06F 11/3027 |
| 2020/0387466 | A1 * | 12/2020 | Curtis | G06F 13/20 |
| 2024/0111619 | A1 * | 4/2024 | Tao | G06F 13/4282 |

* cited by examiner

*Primary Examiner* — Joseph D Manoskey
(74) *Attorney, Agent, or Firm* — Greenberg Traurig, LLP

(57) ABSTRACT

A disclosed method for restoring bus functionality includes detecting, by an automatic bus recovery block, that at least one target device on a bus pulls at least one line of the bus to a low level. The method also includes initiating, by the automatic bus recovery block, a timer to time a duration of the low level of the line. Additionally, the method includes detecting, by the automatic bus recovery block, that the duration of the low level of the line exceeds a predetermined time limit. Furthermore, the method includes alerting, by the automatic bus recovery block, a controller device on the bus that the duration of the low level exceeds the predetermined time limit to reset the line of the bus to a high level. Various other methods, systems, and computer-readable media are also disclosed.

20 Claims, 7 Drawing Sheets

SYSTEMS AND METHODS FOR RESTORING BUS FUNCTIONALITY

BACKGROUND

Data buses are used to connect and transfer data between multiple computing components or multiple devices. Some computer buses have one or more controller devices or nodes that monitor and/or control the data transfer on the bus. These controller devices manage a multitude of target devices, or nodes, that respond to communication from the controller devices. In some designs, a bus uses open-collector or open-drain lines, which enable components with different operating voltage levels to connect to the same bus. For example, buses with an I2C protocol enable target devices of lower clock or data transfer speeds to pull a line, such as a serial clock line (SCL) or a serial data line (SDA), of the bus to a lower level as needed. By temporarily halting the bus clock, target devices with lower data rates can complete a data transfer by holding the bus at the lower level, without releasing the bus to a faster target device. The present disclosure identifies and addresses a need for systems and methods for restoring bus functionality.

BRIEF DESCRIPTION OF THE DRAWINGS

The accompanying drawings illustrate a number of example implementations and are a part of the specification. Together with the following description, these drawings demonstrate and explain various principles of the present disclosure.

Figure 1:
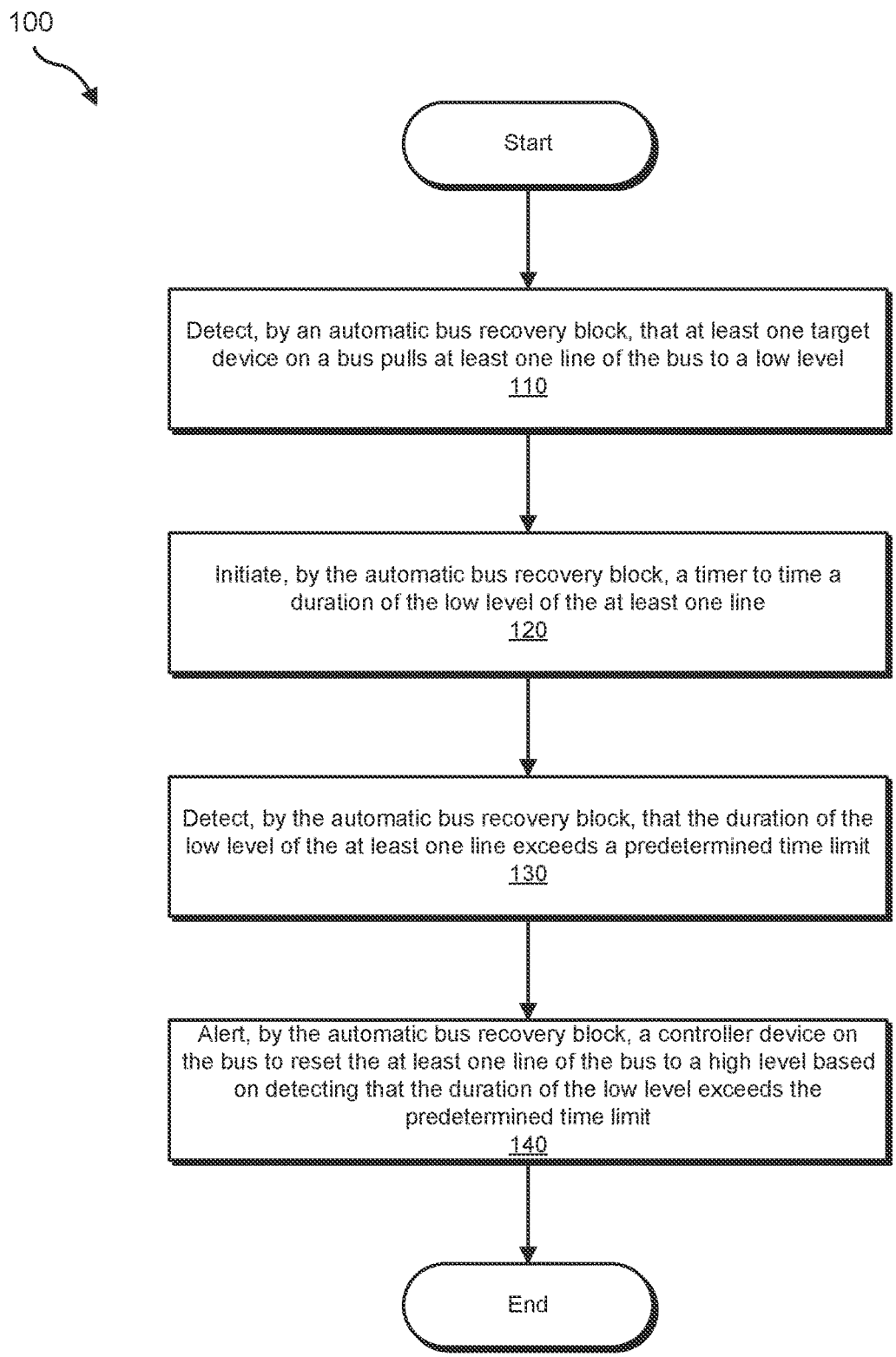
FIG. 1 is a flow diagram of an example method for restoring bus functionality.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXEMPLARY IMPLEMENTATIONS

The present disclosure is generally directed to systems and methods for restoring bus functionality. As described below, by pulling an open-drain line of a bus to a low level or low rate, a slower target device effectively slows all devices on the bus. For example, clock stretching enables a target device on an I2C bus to pull the SCL line of the bus to ground, thereby halting data transfer on the bus until the target device is ready. In this example, a controller device waits for the target device to complete the action before the bus is open for use by other target devices, thereby ensuring a slow target device can still complete a data transfer. In another example, a target device can slow the rate of the bus without completely halting data transfer. In this example, other devices, including the controller device, are also restrained to the slower bus rate.

However, if the slow target device has an error or malfunctions, or otherwise does not complete the action within a limited time period, the controller device continues to wait indefinitely, causing the bus to be locked and unusable while waiting to be released by the target device. In this example, the bus continues to maintain the low level and cannot return to a high level, such as through an attempt by another target device to start transferring data or commands and pull the line back to the high level. Thus, a time-out policy is needed to manage the possibility of target device malfunction and avoid indefinitely locking a data bus.

In some implementations, the disclosed method first detects when a bus is inactive or waiting. To monitor the bus, the method implements an automatic bus recovery block to monitor and manage the bus. In a non-limiting example, the method uses the automatic bus recovery block to detect that a target device on the bus has pulled a line, such as a clock control line, to a low state. In one implementation, the method detects a voltage of the bus falls below a predetermined threshold. A voltage below the predetermined threshold indicates the line of the bus is grounded. By detecting the voltage falls below the threshold, the automatic bus recovery block determines the bus is currently waiting for the target device. The disclosed method then triggers a timer to begin timing the wait for the slower target device. In this implementation, the timer continues to count the duration of the line remaining in the low state until the target device releases the bus.

Subsequently, the automatic bus recovery block detects that the duration of the waiting period exceeds a time limit. By tracking the time spent waiting for the target device, the disclosed method determines when a device is taking too long and can be malfunctioning. In some non-limiting examples, the time limit is set by an administrator of the bus. Additionally or alternatively, the time limit can be based on historical data indicating an appropriate wait time for the target devices on the bus. The automatic bus recovery block then alerts a controller device that the wait time has exceeded the limit and that the bus requires a reset. In one non-limiting example, the controller device forces target devices on the bus to reset or to reload firmware, which releases the bus. In another example, the controller device can reload its own firmware to ensure the controller device firmware does not cause the bus hang. In other words, when a target device causes an unacceptably long wait, the automatic bus recovery block resets the bus to enable other target devices to continue using the bus.

Furthermore, the method can downgrade the bus to a lower data rate or transfer speed for subsequent use, thereby avoiding a repeated loop of the slower target device causing a bus hang. In a non-limiting example, the method selects the next lower data rate to account for potentially lower rate target devices that can cause the long wait times. In this example, the automatic bus recovery block can also set an appropriate new time limit for the lower data rate. Thus, the disclosed systems and methods manage data buses to avoid indefinitely waiting for target devices.

As will be described in greater detail below, the present disclosure describes various systems and methods for restoring bus functionality. In one implementation, a computer-implemented method for restoring bus functionality includes detecting, by an automatic bus recovery block, that at least one target device on a bus pulls at least one line of the bus to a low level. This method also includes initiating, by the automatic bus recovery block, a timer to time a duration of the low level of the at least one line. Additionally, this method includes detecting, by the automatic bus recovery block, that the duration of the low level of the at least one line exceeds a predetermined time limit. Furthermore, this method includes alerting, by the automatic bus recovery block, a controller device on the bus to reset the at least one line of the bus to a high level based on detecting that the duration of the low level exceeds the predetermined time limit.

In one example, the bus includes an open-drain bus design utilizing a weak pull-up resistor and a strong pull-down resistor. In this example, the open-drain bus design prevents a different target device on the bus from pulling the at least one line of the bus to the high level, by attempting to take over the bus, and only returns the bus to a high level when the at least one target device releases the bus.

In one example, the at least one line of the bus comprises a clock control line that enforces a timing of the bus set by the controller device. In this example, the at least one target device pulls the at least one line of the bus to the low level by suspending the timing of the bus for the duration of the low level.

In one example, the method of detecting that the at least one target device pulls the at least one line of the bus to the low level includes detecting that a voltage of the bus drops below a threshold voltage.

In one example, the method of alerting the controller device to reset the at least one line of the bus to a high level includes initiating a reset component of the controller device.

In one example, the disclosed method further includes downgrading a data rate of the bus in response to the duration of the low level exceeding the predetermined time limit. In this example, downgrading the data rate of the bus includes selecting a data rate one rate lower than a current data rate of the bus.

In one example, the disclosed method further includes detecting that the at least one target device releases the bus. In this example, detecting that the at least one target device releases the bus includes detecting that a voltage of the bus rises above a threshold voltage. In this example, the disclosed method also includes resetting the timer in response to detecting the at least one target device releases the bus.

In one implementation, a controller device for restoring bus functionality includes a timer, a reset component, and an automatic bus recovery block. In this implementation, the automatic bus recovery block is configured to detect that at least one target device on a bus pulls at least one line of the bus to a low level, to initiate the timer to time a duration of the low level of the at least one line, to detect that the duration of the low level of the at least one line exceeds a predetermined time limit, and to alert the reset component to reset the at least one line of the bus to a high level based on detecting that the duration of the low level exceeds the predetermined time limit.

In one example, the reset component resets the at least one line of the bus to the high level by forcing a reset of the at least one target device, forcing a reset of at least one other target device, forcing the at least one target device to reload a target device firmware, and/or reloading a controller device firmware.

In one example, the automatic bus recovery block is further configured to downgrade a data rate of the bus in response to the duration of the low level exceeding the predetermined time limit.

In one implementation, a system for restoring bus functionality includes at least one bus, at least one controller device connected to the at least one bus, at least one target device connected to the at least one bus, and at least one automatic bus recovery block connected to the at least one bus. In this implementation, the automatic bus recovery block is configured to detect that the at least one target device pulls at least one line of the at least one bus to a low level, to initiate a timer to time a duration of the low level of the at least one line, to detect that the duration of the low level of the at least one line exceeds a predetermined time limit, and to alert the at least one controller device to reset the at least one line of the at least one bus to a high level based on detecting that the duration of the low level exceeds the predetermined time limit.

In one example, the at least one bus includes at least one clock control line that enforces a timing of the at least one bus set by the at least one controller device. In this example, the at least one controller device periodically scans the clock control line of the at least one bus to detect a change in a level of the clock control line in response to detecting an initiation of a data transfer using the data line. Additionally or alternatively, the bus includes at least one data line that transfers data between the at least one controller device and the at least one target device.

In one example, the at least one automatic bus recovery block includes a component of the at least one controller device. In another example, the at least one automatic bus recovery block includes a separate device electronically connected to the at least one controller device or a component of the controller device separate from other components of the controller device.

In one example, the predetermined time limit is based on an administrator setting, a firmware configuration, an identification of types of target devices connected to the at least one bus, and/or an identification of data rates of target devices connected to the at least one bus.

In one example, the at least one controller device is configured to downgrade a data rate of the at least one bus in response to the duration of the low level exceeding the predetermined time limit.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIG. 1, detailed descriptions of a computer-implemented method for restoring bus functionality. Detailed descriptions of a corresponding system will also be provided in connection with FIG. 2. In addition, detailed descriptions of an exemplary clock control line and an exemplary data line of an exemplary bus, as used by exemplary target devices, will be provided in connection with FIGS. 3-5. Furthermore, detailed descriptions of an example controller device for restoring bus functionality will be provided with FIG. 6. Finally, detailed descriptions of an exemplary system architecture with multiple exemplary controller devices and multiple exemplary target devices will be provided in connection with FIG. 7.

FIG. 1 is a flow diagram of an example computer-implemented method 100 for restoring bus functionality. The steps shown in FIG. 1 can be performed by any suitable computer-executable code and/or computing system, including system 200 in FIG. 2, controller device 204 in FIG. 6, controller devices 204(1)-(2) in FIG. 7, and/or variations or combinations of one or more of the same. In one example, each of the steps shown in FIG. 1 can represent an algorithm whose structure includes and/or is represented by multiple sub-steps, examples of which will be provided in greater detail below.

As illustrated in FIG. 1, at step 110 one or more of the systems described herein can detect that one or more target devices on a bus pulls at least one line of the bus to a low level. For example, an automatic bus recovery block 202 of a system 200 in FIG. 2 detects that a target device 208(1) pulls a line 210 of a bus 206 to a low level.

Figure 2:
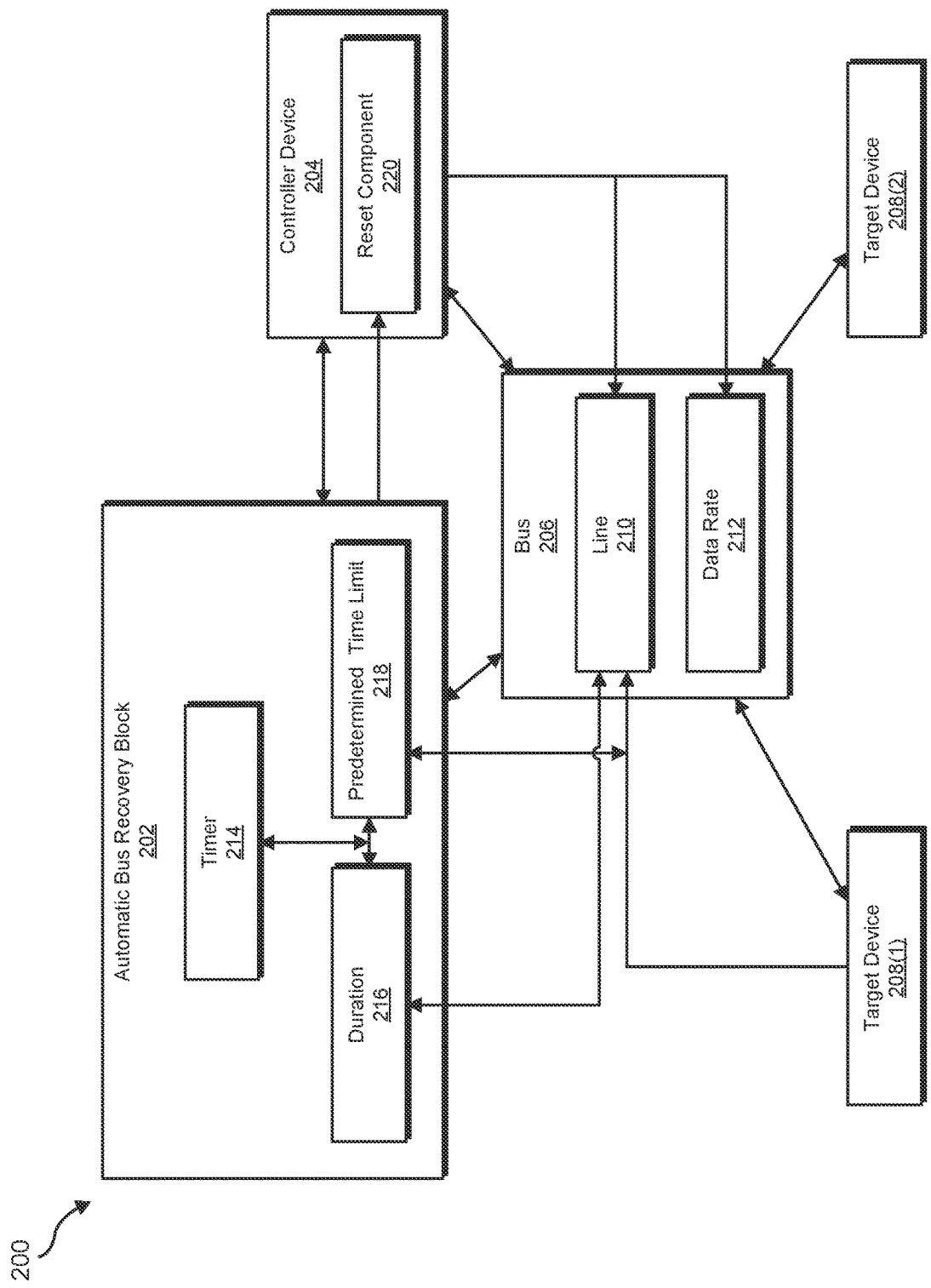
FIG. 2 is a block diagram of an example system for restoring bus functionality.

Step 110 can be performed in a variety of ways. As shown in the example of FIG. 2, system 200 includes target device 208(1) and a target device 208(2), each connected to bus 206. In this example, system 200 also includes a controller device 204 and automatic bus recovery block 202 connected to bus 206. In some examples, target device 208(1), target device 208(2), and/or controller device 204 represent any type or form of computing device capable of reading computer-executable instructions. In non-limiting examples, the terms "device" or "computing device" refer to any form of computing equipment capable of storing, receiving, and/or transmitting data. In these non-limiting examples, the term "controller device" refers to a device that initiates a transfer of data on a bus. Additionally, in these non-limiting examples, the term "target device" refers to any type or form of computing device that can respond to a controller device on a bus. In some examples, controller device 204 represents a device, a silicon chip, a chipset, and/or an integrated circuit designed to manage bus 206. For example, target devices 208(1)-(2) receive instructions from controller device 204 via bus 206.

In non-limiting examples, the term "bus" refers to a data bus capable of transmitting data between devices and/or computing components. In some examples, bus 206 transmits data between distinct computing devices or over a network. In other examples, bus 206 resides within a computing device and transmits data between components of the computing device.

In some examples, system 200 represents a network of computing devices connected via bus 206. In other examples, system 200 represents a computing device, a processor, and/or any other suitable computing system or device with a bus. Additional examples of computing devices include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

In some examples, system 200, automatic bus recovery block 202, and/or controller device 204 can include a processor that implements method 100. In one example, the term "processor" refers to any type or form of hardware-implemented processing unit capable of interpreting and/or executing computer-readable instructions. Examples of processors include, without limitation, microprocessors, microcontrollers, Central Processing Units (CPUs), Graphical Processing Units (GPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Many other devices or subsystems can be connected to system 200 in FIG. 2. Conversely, all of the components and devices illustrated in FIG. 2 need not be present to practice the implementations described and/or illustrated herein. The devices and subsystems referenced above can also be interconnected in different ways from that shown in FIG. 2. System 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," in some non-limiting examples, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

As illustrated in the non-limiting example of FIG. 2, automatic bus recovery block 202 is a separate device electronically connected to controller device 204. For example, automatic bus recovery block 202 can represent all or portions of one or more special-purpose devices configured to restore bus function. In this example, automatic bus recovery block 202 interacts with controller device 204 to control bus 206 as part of system 200.

In alternate examples, all or a portion of automatic bus recovery block 202 is a component of controller device 204. In examples such as FIG. 6, automatic bus recovery block 202 is a software application or code that, when executed by controller device 204, causes controller device 204 to perform one or more tasks. For example, and as will be described in greater detail below, automatic bus recovery block 202 can be stored and configured to run on controller device 204. In this example, automatic bus recovery block 202 implements method 100 as part of controller device 204, rather than separately as part of system 200 of FIG. 2.

In a non-limiting example, the term "line" refers to a type of wire for carrying data and/or a signal, such as a clock signal, between endpoints. In the example of an I2C bus, bus 206 includes two lines, the SCL and the SDA lines. In other examples, bus 206 includes one or more additional lines. Additionally, each line, including line 210 of FIG. 2, can have at least one high level and at least one low level. In non-limiting examples, the term "high level" refers to a high speed or a high rate of data transfer. Similarly, in non-limiting examples, the term "low level" refers to a low speed or a low rate of data transfer. In some non-limiting examples, line 210 can remain at a high level when not in use and move to a low level when being used by a target device requiring the lower level.

In one example, bus 206 includes an open-drain bus design utilizing a weak pull-up resistor and a strong pull-down resistor. In this example, the term "open-drain" refers to a bus design that pulls a voltage of the bus to a steady state, such as a ground power level or a common collector voltage (VCC). In this example, the term "pull-up resistor" refers to a resistor used to switch a logic circuit to a high level, and the term "pull-down resistor" refers to a resistor used to switch the logic circuit to a low level. Additionally, in these examples, the term "resistor" refers to an electrical resistor component that regulates electrical current, a metal-oxide-semiconductor field-effect transistor (MOSFET), and/or any other component that provides electrical resistance in a circuit. In some example, a logic circuit switches between a high level and a single low, or ground, level. In the open-drain bus design, the strong pull-down resistor takes precedence over the weak pull-up resistor such that, if a target device uses a pull-down resistor, a second target device cannot switch the level back to high with a pull-up resistor.

In the above example, the open-drain bus design prevents target device 208(2) on bus 206 from pulling line 210 to the high level until target device 208(1) releases bus 206. In other words, although the open-drain bus design enables various target devices with different data rates or different levels to connect to line 210, the design precludes target devices from pulling line 210 back to the high level when line 210 is pulled to the low level.

In one example, line 210 of bus 206 is a clock control line that enforces a timing of bus 206 set by controller device 204. In the example of I2C buses, line 210 is the SCL line. In the example of FIG. 2, target device 208(1) pulls line 210 to the low level by suspending the timing of bus 206 for the duration of the low level. In this example, target device 208(1) suspends or slows all transactions on bus 206. Additionally, by pulling line 210 to the low level, target device 208(1) forces controller device 204 to adapt to the same operating rate or timing as target device 208(1).

In some examples, automatic bus recovery block 202 detects that target device 208(1) pulls line 210 to the low level by detecting that a voltage of bus 206 drops below a threshold voltage. In a non-limiting example, a typical voltage of bus 206 is at or above 300 mV. When bus 206 is inactive, the voltage drops to between 0-300 mV. Thus, automatic bus recovery block 202 detects that the voltage drops below 300 mV when target device 208(1) pulls line 210 to ground, with or without use of electrical resistance.

In one example, bus 206 includes both the clock control line that enforces the timing of bus 206 and a data line that transfers data between controller device 204 and target devices 208(1)-(2). In the example of I2C buses, the data line is the SDA line. In one example, the data line is bidirectional between controller device 204 and target devices 208(1)-(2). In this example, the clock control line is a single direction, with controller device 204 controlling the clock speed. However, as previously described, target devices 208(1)-(2) can pull the clock control line to the low level to temporarily hold the line.

Figure 3:
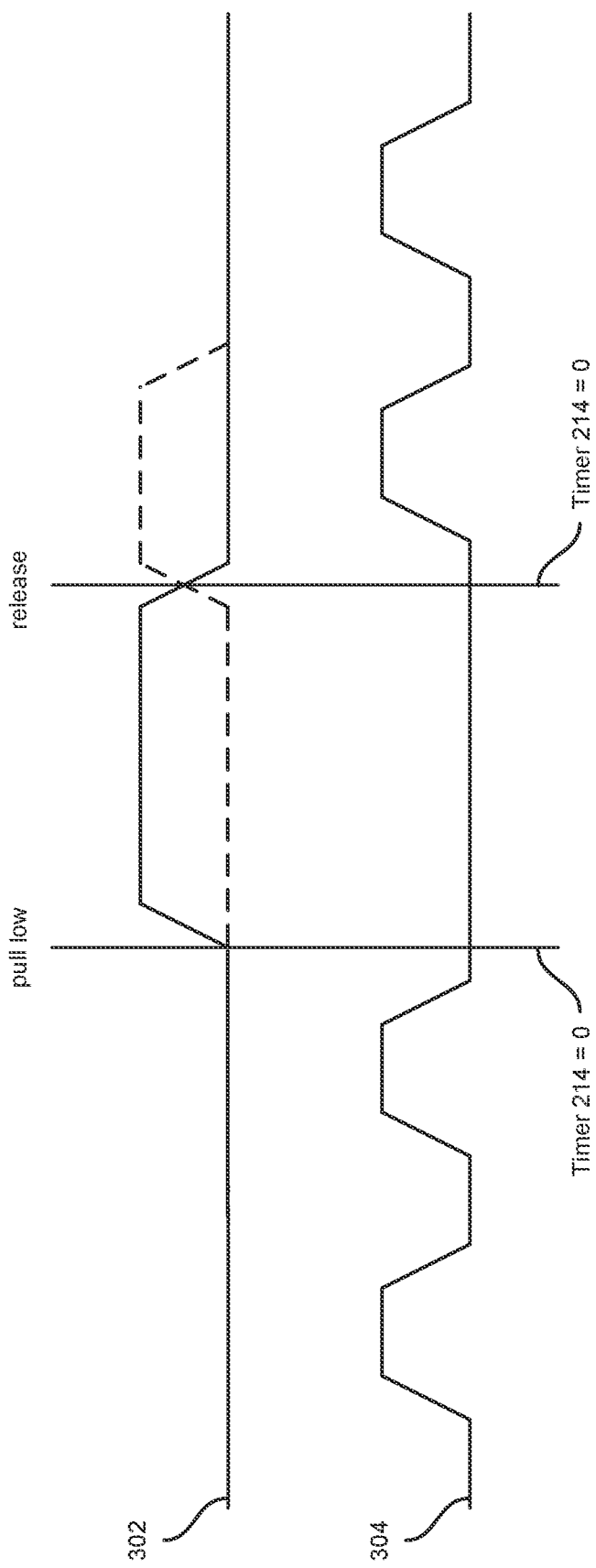
FIG. 3 illustrates an exemplary clock control line and an exemplary data line of an exemplary bus, as used by exemplary target devices.
Figure 4:
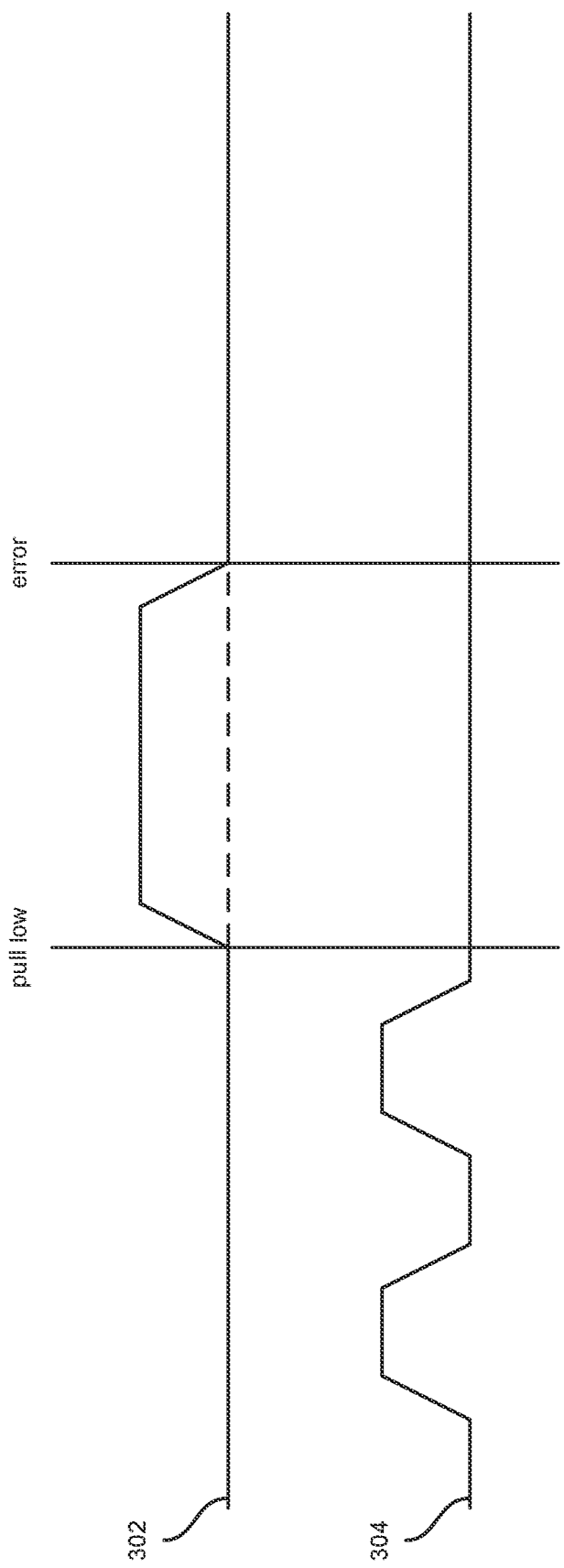
FIG. 4 illustrates an exemplary error of an exemplary target device during use of the exemplary bus.
Figure 5:
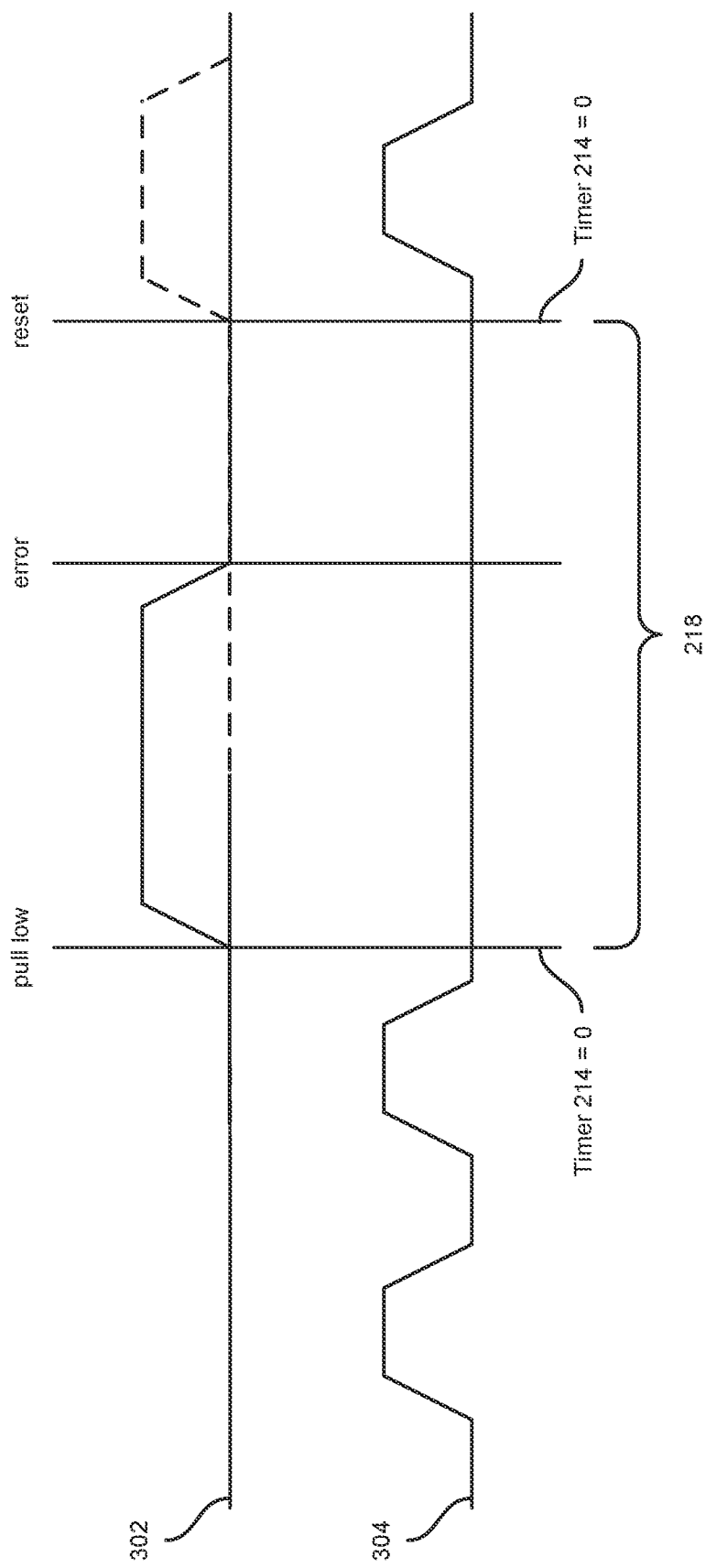
FIG. 5 illustrates an exemplary forced reset of the exemplary target device with the exemplary error.

FIGS. 3-5 illustrate examples of bus 206 with a data line 302 and a clock control line 304. As illustrated in these examples, target device 208(1) of FIG. 2 pulls clock control line 304 to maintain the low level, as represented by a solid line. In these examples, target device 208(2), as represented by a dotted line, cannot pull clock control line 304 back to the high level until target device 208(1) releases it. In the example of FIG. 3, the switch between target device 208(1) and target device 208(2) happens at about the same time, such that target device 208(2) uses data line 302 as soon as target device 208(1) stops. In this example, the switch between target device 208(1) and target device 208(2) is initiated by controller device 204, with target devices 208(1) and 208(2) receiving commands from controller device 204.

Returning to FIG. 1, at step 120 one or more of the systems described herein can initiate a timer to time a duration of the low level of the line. For example, automatic bus recovery block 202 in FIG. 2 initiates a timer 214 to time a duration 216 of the low level of line 210.

Step 120 can be performed in a variety of ways. In one example, controller device 204 and/or automatic bus recovery block 202 periodically scans clock control line 304 of bus 206, such as scanning once every millisecond, to detect a change in a level of clock control line 304 in response to detecting an initiation of a data transfer using data line 302. In the example of FIG. 3, target device 208(1) initiates a data transfer on data line 302, and controller device 204 and/or automatic bus recovery block 202 scans clock control line 304 to detect that target device 208(1) pulls clock control line 304 to the low level.

In the above example of bus 206 having an active voltage of at least 300 mV, timer 214 is triggered when the detected voltage falls below 300 mV. In the example of FIG. 3, timer 214 is set to begin at 0 at the point of target device 208(1) pulling clock control line 304 to the low level. In some examples, duration 216 of the low level represents bus hang time.

Returning to FIG. 1, at step 130 one or more of the systems described herein can detect that the duration of the low level of the line exceeds a predetermined time limit. For example, automatic bus recovery block 202 in FIG. 2 detects that duration 216 of the low level of line 210 exceeds a predetermined time limit 218.

Step 130 can be performed in a variety of ways. In one example, predetermined time limit 218 is based on one or more of an administrator setting, a firmware configuration, an identification of types of target devices connected to bus 206, and/or an identification of data rates of the target devices. For example, an administrator of system 200 sets a static time limit to wait while line 210 is held low. As another example, a firmware configuration of system 200, controller device 204, and/or a firmware configuration of target devices 208(1)-(2) can dictate a specific wait time for bus 206. In some examples, predetermined time limit 218 is calculated from data about typical wait times for target devices 208(1)-(2), for target devices of the type of target devices 208(1)-(2), and/or for target devices with the data rates of target devices 208(1)-(2). For example, historical data can be analyzed to determine appropriate wait times for different types and configurations of target devices.

Figure 7:
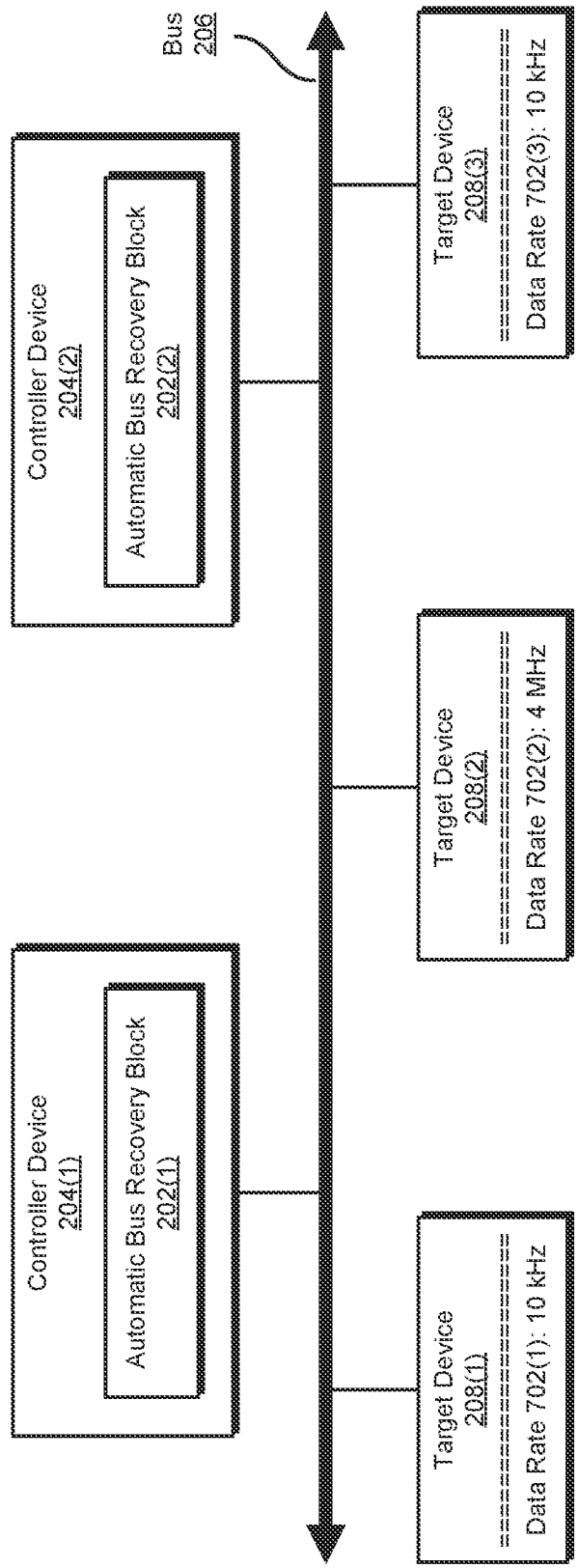
FIG. 7 is a block diagram of an exemplary system architecture with multiple exemplary controller devices and multiple exemplary target devices.

In one example, the term "data rate" refers to a speed of transmitting data. For example, a data rate of 1 Hz is equivalent to 1 cycle per second. In the example of FIG. 7, target devices 208(1) and 208(3) have data rates 702(1) and 702(3) of 10 kHz. In contrast, target device 208(2) has a data rate 702(2) of 4 MHz. In this example, though target device 208(2) is capable of much faster data transmission, predetermined time limit 218 is a longer time to accommodate slower target devices 208(1) and 208(3). In other examples, higher speed target devices connected to bus 206 can cause predetermined time limit 218 to be set at a shorter wait time.

In some examples, if duration 216 of the low level of line 210 does not exceed predetermined time limit 218, system 200 continues to wait and maintain the low level. For example, as illustrated in FIG. 3, timer 214 is initiated when target device 208(1) pulls clock control line 304 low, but target device 208(1) releases bus 206 before timer 214 reaches predetermined time limit 218. In this example, automatic bus recovery block 202 detects that target device 208(1) releases bus 206 and resets timer 214 in response to detecting the release. Additionally, in some examples, detecting target device 208(1) releases bus 206 includes detecting the voltage of bus 206 rises above the threshold voltage, such as above 300 mV.

Returning to FIG. 1, at step 140 one or more of the systems described herein can alert a controller device on the bus to reset the line of the bus to a high level based on detecting that the duration of the low level exceeds the predetermined time limit. For example, automatic bus recovery block 202 in FIG. 2 alerts controller device 204 to reset line 210 to a high level based on detecting that duration 216 of the low level exceeds predetermined time limit 218.

Step 140 can be performed in a variety of ways. In one example, automatic bus recovery block 202 alerts controller device 204 to reset line 210 by initiating a reset component 220 of controller device 204. In the example of FIG. 2, reset component 220 is a component of controller device 204. In alternate example, reset component 220 is a separate component triggered by duration 216 exceeding predetermined time limit 218.

As illustrated in FIG. 4, an error can occur after target device 208(1) pulls clock control line 304 to the low level. This error can be a failure of target device 208(1), an error in a firmware of target device 208(1), an error in a firmware of controller device 204, and/or any other error causing a bus hang. In this example, without timer 214, clock control line 304 continues to remain at the low level, precluding target device 208(2) from using bus 206.

In contrast, in the example of FIG. 5, timer 214 is initiated when target device 208(1) pulls clock control line 304 to the low level. In this example, when automatic bus recovery block 202 detects that duration 216 exceeds predetermined time limit 218, system 200 initiates a reset to release bus 206 and enable target device 208(2) to use bus 206. In this example, timer 214 is reset to 0. For example, by using bus 206, target device 208(2) causes the voltage of bus 206 to increase above 300 mV. Thus, timer 214 resets in response to detecting the voltage is above the threshold voltage.

In one example, reset component 220 resets line 210 of bus 206 to the high level by forcing a reset of target device 208(1). Additionally or alternatively, reset component 220 can force a reset of target device 208(2) and/or other target devices. For example, reset component 220 can force a reset of all devices on bus 206. In another example, reset component 220 can force target device 208(1) to reload a target device firmware and/or cause controller device 204 to reload a controller device firmware.

Figure 6:
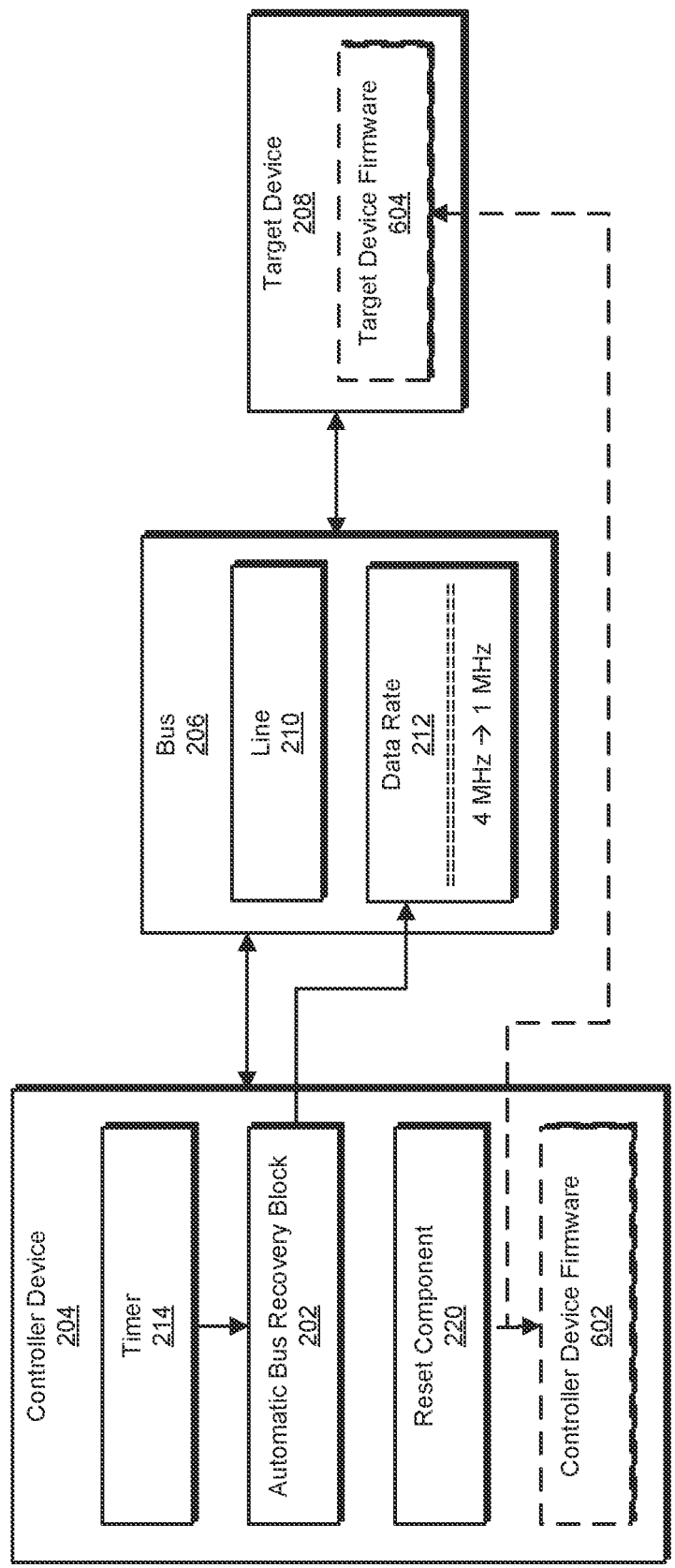
FIG. 6 is a block diagram of an example controller device for restoring bus functionality.

As illustrated in the non-limiting example of FIG. 6, controller device 204 includes timer 214, automatic bus recovery block 202, reset component 220, and a controller device firmware 602. Additionally, a target device 208 can have a target device firmware 604. In this example, reset component 220 forces target device 208 to reload target device firmware 604 while also reloading controller device firmware 602 for controller device 204.

In one example, automatic bus recovery block 202 downgrades a data rate of bus 206 in response to duration 216 of the low level exceeding predetermined time limit 218. In the example, of FIG. 2, controller device 204 downgrades data rate 212 of bus 206. By downgrading data rate 212, system 200 can decrease the likelihood of slower target device 208(1) from causing another bus hang by pulling bus 206 to the low level after reset.

In one example, system 200 can select a data rate one rate lower than a current data rate of bus 206 during downgrading of data rate 212. For example, as illustrated in FIG. 6, data rate 212 is downgraded from 4 MHz to 1 MHz. In the example of FIG. 7, target devices 208(1) and 208(3) have data rates 702(1) and 702(3) of 10 kHz. In this example, data rate 212 of bus 206 can continue to downgrade with each bus hang until it reaches 10 kHz to accommodate target devices 208(1) and 208(3). Additionally, in the example of FIG. 7, a controller device 204(1) and a controller device 204(2) can each have an automatic bus recovery block 202(1) and an automatic bus recovery block 202(2), respectively. In this example, controller devices 204(1) and 204(2) can share control of bus 206. For example, automatic bus recovery block 202(1) can alternate downgrading rates of bus 206 with automatic bus recovery block 202(2).

As described above, the disclosed systems and methods restore bus functionality in the event of an error causing a bus hang. Accordingly, the implementations and systems described herein first detect, by an automatic bus recovery block, that one or more target devices on a bus pulls one or more lines, such as the SCL line of an I2C bus, of the bus to a low level. The disclosed method also initiates, by the automatic bus recovery block, a timer to time a duration of the low level of the line. The method then detects, by the automatic bus recovery block, that the duration of the low level of the line exceeds a predetermined time limit. Additionally, the method alerts, by the automatic bus recovery block, a controller device on the bus to force target devices on the bus to reset and to reset the bus to a higher line based on the duration of the low level exceeding the time limit. Furthermore, the method downgrades a data rate of the bus in response to the duration of the low level exceeding the time limit. Thus, the disclosed systems and methods can restore bus functionality without requiring changes to outside circuit designs or customer devices.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 200 in FIG. 2 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In some examples, all or a portion of example system 200 in FIG. 2 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting, by an automatic bus recovery block, that at least one target device on a bus pulls at least one line of the bus to a low level;
   initiating, by the automatic bus recovery block, a timer to time a duration of the low level of the at least one line;
   detecting, by the automatic bus recovery block, that the duration of the low level of the at least one line exceeds a predetermined time limit;
   alerting, by the automatic bus recovery block, a controller device on the bus to reset the at least one line of the bus to a high level based on detecting that the duration of the low level exceeds the predetermined time limit; and
   adjusting the predetermined time limit in response to the duration of the low level exceeding the predetermined time limit.

2. The method of claim 1, wherein the bus comprises an open-drain bus design utilizing:
   a weak pull-up resistor; and
   a strong pull-down resistor.

3. The method of claim 2, wherein the open-drain bus design prevents a different target device on the bus from pulling the at least one line of the bus to the high level until the at least one target device releases the bus.

4. The method of claim 1, wherein the at least one line of the bus comprises a clock control line that enforces a timing of the bus set by the controller device.

5. The method of claim 4, wherein the at least one target device pulling the at least one line of the bus to the low level comprises suspending the timing of the bus for the duration of the low level.

6. The method of claim 1, wherein detecting that the at least one target device pulls the at least one line of the bus to the low level comprises detecting that a voltage of the bus drops below a threshold voltage.

7. The method of claim 1, wherein alerting the controller device to reset the at least one line of the bus to a high level comprises initiating a reset component of the controller device.

8. The method of claim 1, further comprising:
   downgrading a data rate of the bus in response to the duration of the low level exceeding the predetermined time limit; and
   alternating downgrading the data rate of the bus with at least one other automatic bus recovery block.

9. The method of claim 8, wherein downgrading the data rate of the bus comprises selecting a data rate one rate lower than a current data rate of the bus.

10. The method of claim 1, further comprising:
    detecting that the at least one target device releases the bus; and
    resetting the timer in response to detecting the at least one target device releases the bus.

11. The method of claim 10, wherein detecting that the at least one target device releases the bus comprises detecting that a voltage of the bus rises above a threshold voltage.

12. A controller device comprising:
    a timer;
    a reset component; and
    an automatic bus recovery block configured to:
       detect that at least one target device on a bus pulls at least one line of the bus to a low level;
       initiate the timer to time a duration of the low level of the at least one line;
       detect that the duration of the low level of the at least one line exceeds a predetermined time limit;
       alert the reset component to reset the at least one line of the bus to a high level based on detecting that the duration of the low level exceeds the predetermined time limit; and
       adjust the predetermined time limit in response to the duration of the low level exceeding the predetermined time limit.

13. The controller device of claim 12, wherein the reset component resets the at least one line of the bus to the high level by at least one of:
    forcing a reset of the at least one target device;
    forcing a reset of a different target device;

forcing the at least one target device to reload a target device firmware; and reloading a controller device firmware.

14. The controller device of claim 12, wherein the automatic bus recovery block is further configured to:

downgrade a data rate of the bus in response to the duration of the low level exceeding the predetermined time limit; and alternate downgrading the data rate of the bus with at least one other automatic bus recovery block.

15. A system comprising:

at least one bus;

at least one controller device connected to the at least one bus;

at least one target device connected to the at least one bus; and at least one automatic bus recovery block connected to the at least one bus and configured to:

detect that the at least one target device pulls at least one line of the at least one bus to a low level;

initiate a timer to time a duration of the low level of the at least one line;

detect that the duration of the low level of the at least one line exceeds a predetermined time limit;

alert the at least one controller device to reset the at least one line of the at least one bus to a high level based on detecting that the duration of the low level exceeds the predetermined time limit; and adjust the predetermined time limit in response to the duration of the low level exceeding the predetermined time limit.

16. The system of claim 15, wherein the at least one bus comprises at least one of:

a clock control line that enforces a timing of the at least one bus set by the at least one controller device; and a data line that transfers data between the at least one controller device and the at least one target device.

17. The system of claim 16, wherein the at least one controller device periodically scans the clock control line of the at least one bus to detect a change in a level of the clock control line in response to detecting an initiation of a data transfer using the data line.

18. The system of claim 15, wherein:

the at least one automatic bus recovery block comprises a component of the at least one controller device; or the at least one automatic bus recovery block comprises a separate device electronically connected to the at least one controller device.

19. The system of claim 15, wherein the predetermined time limit is based on at least one of:

an administrator setting;

a firmware configuration;

an identification of types of target devices connected to the at least one bus; and an identification of data rates of target devices connected to the at least one bus.

20. The system of claim 15, wherein the at least one controller device is configured to:

downgrade a data rate of the at least one bus in response to the duration of the low level exceeding the predetermined time limit; and alternate downgrading the data rate of the at least one bus with at least one other controller device.

\* \* \* \* \*